US005309805A

United States Patent [19]

Mezger et al.

[11] Patent Number: 5,309,805

[45] Date of Patent: May 10, 1994

[54] CUTTING KNIFE

[75] Inventors: Dieter Mezger, Güglingen, Fed. Rep. of Germany; Maurice Dilasseur, Pontoise, France

[73] Assignee: C. & E. Fein GmbH & Co., Stuttgart, Fed. Rep. of Germany

[21] Appl. No.: 120,652

[22] Filed: Sep. 13, 1993

Related U.S. Application Data

[63] Continuation of Ser. No. 930,919, Aug. 17, 1992, abandoned.

[30] Foreign Application Priority Data

Aug. 17, 1991 [DE] Fed. Rep. of Germany ....... 4127239

[51] Int. Cl.[5] ........................ B26B 29/00; B23P 19/04

[52] U.S. Cl. ........................................ 83/821; 30/169; 30/272.1; 30/294; 30/314

[58] Field of Search ................. 83/821, 881, 883, 884, 83/885, 886; 30/272.1, 162, 169, 294, 300, 314, 310, 164.95

[56] References Cited

U.S. PATENT DOCUMENTS

| | | | |
|---|---|---|---|
| 1,750,718 | 3/1930 | Lenston | 83/886 |
| 2,242,514 | 5/1941 | De Smith | 83/886 |
| 2,872,732 | 2/1959 | Arrowood | 30/314 |
| 4,176,452 | 12/1979 | Duggins et al. | 30/294 |
| 4,199,852 | 4/1980 | Ayers et al. | 30/294 |
| 4,700,478 | 10/1987 | Mezger et al. | 30/294 |
| 4,989,320 | 2/1991 | Borkott et al. | 30/272.1 |

FOREIGN PATENT DOCUMENTS

| | | |
|---|---|---|
| 0174427 | 3/1985 | European Pat. Off. . |
| 8506246 | 3/1985 | Fed. Rep. of Germany . |

*Primary Examiner*—Scott Smith

*Attorney, Agent, or Firm*—Barry R. Lipsitz

[57] ABSTRACT

A cutting knife for a cutting tool equipped with an oscillating drive, for cutting off the cement bead of a glass pane cemented in place, in particular in a motor vehicle, comprises at least one cutter element which can be connected, via a mounting element and a mounting opening, to an oscillating drive by which the cutting tool can be set into an oscillating motion about a rocking axis. In order to enable the cutting depth of the cutting tool in the material to be adjusted, the cutter element is provided with a slot extending between the mounting opening and an end of the cutter element opposite the mounting opening, with a roller being held thereon for displacement along the longitudinal axis of the slot. Alternatively, there may be provided a disk-shaped stop member, arranged for being adjusted by means of an oblong hole on a bolt of the cutter element, the stop member being made from a ductile metal, in particular from copper, whereby wear and the development of noise are reduced and damage to the vehicle body is prevented.

15 Claims, 3 Drawing Sheets

CUTTING KNIFE

This application is a continuation of commonly assigned, copending U.S. patent application Ser. No. 07/930,919 filed Aug. 17, 1992, now abandoned.

The present invention relates to a cutting knife for a cutting tool equipped with an oscillating drive, for cutting off the cement bead of a glass pane cemented in place, in particular in a motor vehicle, the cutting knife having a mounting element provided with a mounting opening by which it can be connected to the oscillating drive, further a first cutter element provided with at least one cutting edge, and a stop projecting laterally from the first cutter element, which stop is adapted for being adjusted along the cutter element and comprises a guide element serving as a guide for the cutting knife.

A cutting knife of this kind has been known from DE 85 06 246 U1. The known cutting knife comprises a bolt provided on one lateral face of the blade, on which a disk-shaped stop member can be fixed, for example by a nut screwed upon the said member, or the like, for limiting the depth of immersion of the blade into the material to be cut. In order to enable the stop to be adjusted, the stop member is provided with an oblong hole which extends in the long direction of the blade, for being engaged by the bolt. Rotation of the stop member relative to the blade is prevented by form-locking engagement between the stop member and the bolt.

With this known cutting knife, the rigid stop, that can be adjusted in the long direction of the blade, has been found to be disadvantageous with respect to handling. Even differently shaped stop members cannot, in many cases, account for the changing space conditions in the joint area between the cemented screen and the flange of the vehicle body. Under unfavorable geometrical conditions, cutting-out of the screen is obstructed by the rigid, fixed stop member. In addition, the cutting efficiency achieved is relatively low, due to the fixed stop member.

It has further been found that the rigid, fixed stop member is subject to heavy wear on its surface which in contact with the flange of the vehicle body, the stop being made from a plastic material in order to prevent damage to the flange of the vehicle body. This leads to variations in cutting depth already after short periods of time, due to wear of the stop member.

EP 0 174 427 B1 describes another cutting knife which can be set into oscillating motion and which is intended for cutting off the cement bead of a pane that has been cemented in place. This knife comprises a fixed supporting stop in the form of a plastic roller.

However, the supporting stop of this cutting knife being not adjustable, it is also not possible to adjust the cutting depth of the blade and, thus, to adapt the cutting knife to the geometrical conditions in the joint area.

Now, it is the object of the present invention to improve a cutting knife of the before-mentioned kind so as to improve its handling properties and to enable the knife to be adapted to the geometrical conditions in the area of the cement bead of a pane which has been cemented in place. At the same time, long service life of the cutting knife is to be ensured, and in particular damage to vehicle bodies is to be prevented when cutting-out screens on motor vehicles.

According to the invention, this object is achieved by a cutting knife comprising a mounting element provided with a mounting opening for mounting said cutting knife on said oscillating drive; at least one cutter element extending from said mounting element, said cutter element having at least one cutting edge, a slot extending longitudinally within said cutter element, and a stop projecting laterally from said cutter element, said stop comprising a rotatable roller; and holding means engaging said slot for guiding said rotatable roller longitudinally displaceable along said slot and for setting said rotatable roller in any desired position along said slot.

The fact that the invention provides for a rotatable roller which is held in a slot in the cutter element for being displaced in the latter's longitudinal direction, provides considerably improved handling properties and at the same time improved possibilities to adapt the unit to the particular geometrical conditions, especially in the area of the cement bead between a vehicle screen that has been cemented in place, and the associated flange of the vehicle body.

By arranging the slot in the cutter element proper, the invention now provides the possibility to configure the stop as a rotating roller. The stop as such may now be given a very small overall size, the adjusting facility being incorporated in the cutter element. The diameter of the roller can be adapted to the geometrical conditions of the particular case, and if necessary the roller may be so arranged as to project, in a given setting range, outwardly beyond the cutting edge, at least on one side.

The fact that during a cutting-out operation the cutting knife can be guided by the rotating roller on the frame at an optimum spacing considerably reduces the risk of damage to the vehicle body. At the same time, an improvement of the cutting efficiency is achieved as there is now no risk for the operator when moving the cutting knife along the body flange at full power. The cutting knife having an adjustable stop, one and the same cutting knife can be used for different window flanges so that a smaller number of specially adapted cutting knives is now required for the different mounting conditions, which reduces the variety of parts and the stock-keeping necessities.

The roller may be made from a plastic material, as usual. The fact that the roller is permitted to rotate reduces considerably the amount of wear of the roller during the cutting process. Since, consequently, the distance once set between the roller and the point of the cutting knife remains unchanged and will not vary as a result of wear, any damage to the vehicle body is positively avoided.

According to a convenient further development of the invention, the axis of rotation of the roller extends substantially in a direction perpendicular to the cutter element. This has the effect that the roller gets into contact with the flange of the vehicle body by its lateral face, and any movement along the flange when cutting off the cement bead can be followed by the roller by a corresponding rotary movement.

According to an additional further development of the invention, a screw with a head portion is held in the slot, and a coaxial supporting sleeve, supporting the roller in rotating relationship, is fixed on the screw.

This design enables the rotatability of the roller to be achieved in a particularly simple way.

According to an additional further improvement of the before-described embodiment of the invention, the supporting sleeve is held between the cutter element and a washer which is fixed by a nut.

This arrangement provides a particularly simple way of fixing the supporting sleeve.

Alternatively, the end of the roller on the side of the nut may be designed as a retaining collar which enables the nut to be fixed thereon directly, without an additional lock washer.

According to an additional further improvement of the invention, the stop ends approximately flush with, or is recessed in the surface of the slot.

This feature provides the advantage that there are no outwardly projecting parts on the side of the cutter element opposite the roller, which on the one hand simplifies the movement of the cutting knife in the gap between the screen and the flange of the vehicle body, and on the other hand avoids any risk of damage to the vehicle body.

According to an additional further improvement of the invention, the screw is guided in the slot, but fixed against rotation.

This simplifies the adjustment of the stop in the longitudinal direction of the slot, as it eliminates the need to hold the screw head by an additional tool when untightening or tightening the screw connection.

Especially when the head portion of the screw is arranged to end approximately flush with, or to be recessed against, the surface of the slot, it will be convenient if the slot is provided with lateral chamfers.

In this case, slotted flat-head screws can be used as the recessed guiding element in the slot.

Fixing the screw against rotation in the slot can be achieved in a very simple way by providing the head portion and/or the shank portion of the screw with a flattened area on at least one side.

The thread of the screw may be flattened laterally in order to enable the screw to be introduced into the slot. According to another preferred embodiment of the invention, a screw with a conventional thread is used, and an insertion opening is provided on one end of the slot, preferably on the side of the mounting element, in order to enable the screw to be introduced.

This arrangement provides the advantages of improved stability and increased strength of the screw.

The roller may consist of a soft material, such as a plastic material, in order to prevent damage to the vehicle body as the cutting knife is guided on it by the roller.

According to an additional further improvement of the invention, the head portion of the screw may be provided with a hexagonal recess.

Given the fact that even if the screw is retained in the slot fixed against rotation, it may still get jammed during tightening, due to the necessary play, this embodiment provides the possibility to untighten or hold the head portion by means of a socket spanner.

Nothing has been said so far with respect of the shape of the cutting knife. The cutter element may be connected directly to the mounting element, or else a connecting element, being bent off twice in opposite senses, may be provided so that the cutting knife as a whole will exhibit a bent-off shape.

Depending on the geometrical conditions of the particular case, such a bent-off shape has been found to be of particularly advantage in many cases.

The cutter element as such may have straight or curved, especially sickle-shaped, cutting edges.

If necessary, an additional further improvement of the invention provides that a second cutter element, extending from the first cutter element at an angle, may be provided at the end of the cutter element opposite the mounting element.

A tool of this shape may be of advantage where the cement bead between the pane and the window frame extends over both legs of the frame element.

Alternatively, the object of the invention is further achieved by the fact that the guide element of a cutting knife of the type described above is made from a metal of high ductility.

It has been found that making the guide element from a metal efficiently prevents wearing of the guide element, irrespective of the shape and arrangement of the stop.

In conventional arrangements, the guide element always has been made from a plastic material in order not to damage the vehicle body, and in particular its paint finish, when cutting out vehicle screens.

According to the invention it has been found that damage to the vehicle body can also be avoided by making the guide element from a ductile material.

While when steel or the like is used for the guide element, the oscillating movement subjects the flange of the vehicle body to heavy stress and causes damage to the paint finish, any such damage to the vehicle body is prevented by the invention by the use of a ductile material which ensures sufficient damping.

It has been found to be of particular advantage if the guide element is made from copper or a copper-based alloy.

This guarantees especially high ductility so that damage to the vehicle body, especially to the paint finish, can be largely excluded if the tool is properly handled.

Moreover, the use of copper or a copper-based alloy provides the particular advantage that the development of noise by the operation of cutting-out screens from flanges of vehicle bodies is greatly reduced, an aspect which is of particular importance when the tool is used in motor shops.

It is preferred also in the case of the before-mentioned designs using a rotatable roller that can be adjusted along a slot in the cutter element to make this roller from a ductile material, preferably copper or a copper-based alloy.

This enables the advantages of the two alternative embodiments to be combined, whereby a particular advantageous embodiment is obtained.

It is understood that the features that have been mentioned before and that will be described hereafter may be used not only in the stated combinations, but also in any other combination or each alone, without departing from the scope of the present invention.

Some preferred embodiments of the invention will now be described in more detail with reference to the drawing in which FIG. 1 shows a top view of a first embodiment of a cutting knife according to the invention;

Figure 1:
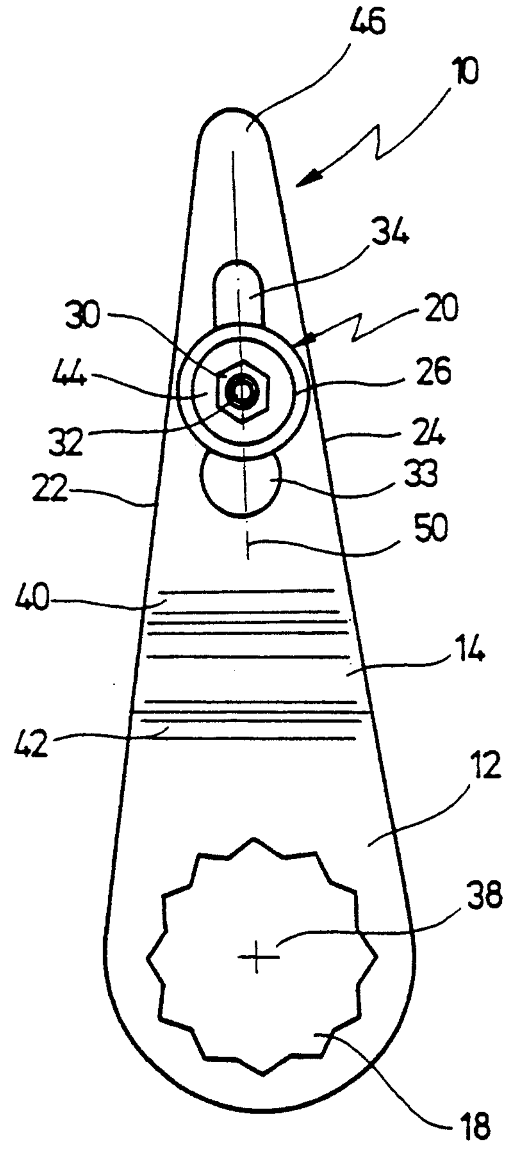

The cutting knife according to FIG. 1, designated generally by reference numeral 10, comprises a mounting element 12 with a mounting opening 18 of twelve-point shape, by means of which the cutting knife can be mounted on the power take-off of an oscillating drive, not shown in the drawing, which sets the cutting knife into an oscillating motion about a rocking shaft 38.

The flat mounting element 12 is followed, via a curvature 42, by a connecting portion 14 formed integrally with the mounting element 12, the connecting portion in its turn being followed, via a second oppositely directed curvature 40, by a cutter element 16 of triangular shape—as viewed in the top view of FIG. 1—which is likewise formed integrally with the other described elements. The cutter element 16 is rounded at its outer end 46 opposite the mounting opening 18. Viewed from the top, the cutting knife has a generally triangular shape with rounded point, the mounting element 12 having its end opposite the cutter element 16 additionally rounded in circular shape around the mounting opening 18.

Figure 3:
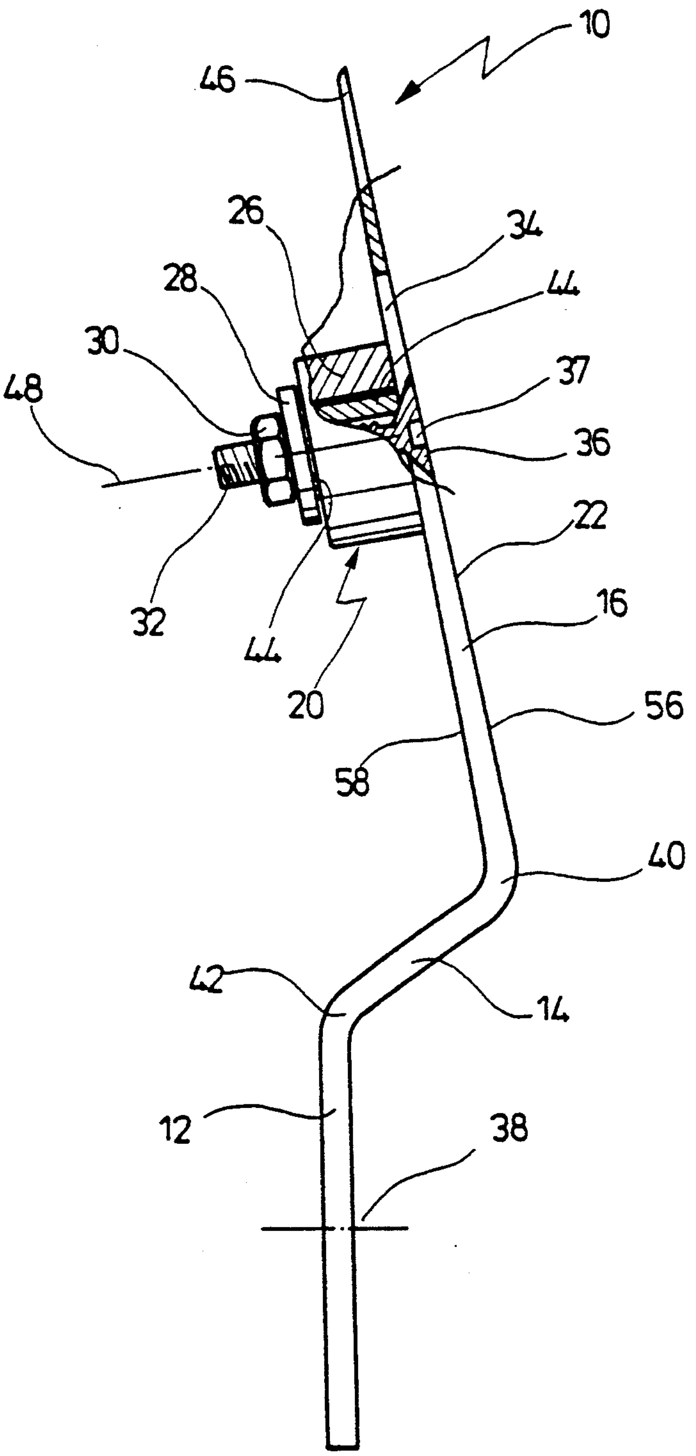
FIG. 3 shows a side view, partly cut, of the cutting knife according to FIG. 1, in enlarged scale.

The connection between the cutter element 16 and the mounting element 12, via the bent-off connecting portion 14, leads to an altogether bent-off shape of the cutting knife 10, as can be seen best in FIG. 3. A first surface of the cutter element 16, the bottom surface 56, opposite the mounting opening 18, is equipped with a plane cutting surface. In contrast, the second surface of the cutter element 16, the upper surface 58, facing the mounting opening 18, is slightly curved and sharpened on both sides toward the bottom face 56 so that two straight cutting edges 22, 24 are formed at the edges forming the junction with the plane bottom face 56 of the cutter element 16.

The cutter element 16 comprises a slot 34 extending between the curvature 40 and the rounded end 46 of the cutter element 16, at about the central area of the latter, over half of the total length of the cutter element 16.

The long axis 50 of the slot 34, whose sidewalls extend in parallel one to other, coincides with the center line of the cutting knife.

Arranged on the slot 34 is a rotatable stop designated generally by 20, which can be adjusted in the longitudinal direction 50 and can be fixed in place by a holding means. The holding means comprises a supporting part formed by the shaft portion of a screw 32 and a guiding part formed by the head portion 36 of said screw.

The stop 20 is mounted on the upper surface 58 of the cutter element 16 by means of the screw 32 that can be moved in the slot 34 and has its head portion 36 recessed therein, as illustrated in FIG. 3. The holding means further comprises a cylindrical supporting sleeve 44 which is arranged coaxially on the shank of the screw 32, and fixed by a nut 30 which is secured against rotation by a retaining collar 28 formed integrally with the supporting sleeve. Alternatively, the retaining collar may be replaced by a separate lock washer. A roller 26 is arranged coaxially on the supporting sleeve 44, with a certain play between the upper surface 58 of the cutting surface and the retaining collar 28. Due to the fact that the inner diameter of the roller 26 is a little larger than the outer diameter of the supporting sleeve 44 and that additionally there exists a certain play between the upper surface 58 and the retaining collar 28, the roller 26 can freely rotate on the supporting sleeve 44.

While the cutter element 16, being integrally formed with the mounting element 12, via the connecting portion 14, is made from knife steel, the roller 26 consists of a plastic material in order to ensure good rotating properties and, at the same time, non-damaging contact as the cutting knife 10 is guided along a flange of a vehicle body.

In order to enable to screw 32 to be introduced into the slot 34, an insertion opening 33 is provided at the end of the slot 34 facing the mounting element 12, which opening takes the form of a circular extension of the slot 34.

For adjusting the stop 20, one untightens the nut 30. This can be effected by holding the head portion 36 of the screw 32 by means of a socket spanner, which is introduced for this purpose into the hexagonal recess 37 in the head portion 36. It is then possible to displace the stop 20 along the slot 34, thereby varying simultaneously the length of projection between the cutting edge 22 and the roller 26, while the distance between the roller 26 and the other cutting edge 24 remains constant. Finally, the nut 30 is re-tightened.

Figure 2:
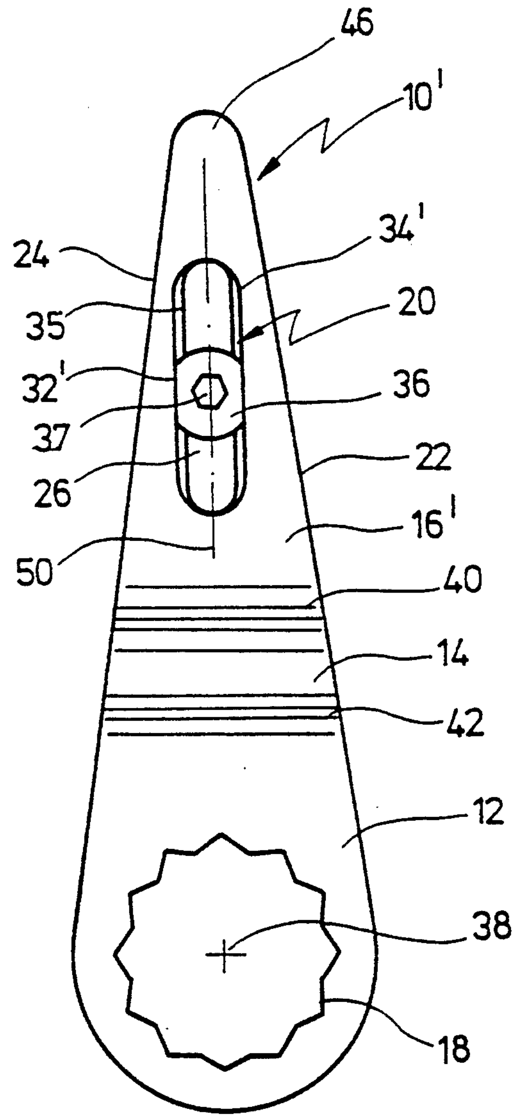
FIG. 2 shows a bottom view of the cutting knife according to FIG. 1, in a slightly modified form.

FIG. 2 shows another embodiment of the cutting knife according to the invention, which is designated generally by numeral 10' and slightly modified as compared with FIGS. 1 and 3. To the extent the different elements of the first embodiment 10 and the second embodiment 10' of the cutting knife are identical, the same reference numerals have been used. Insofar, reference is made to the explanations relating to FIGS. 1 and 3.

The cutting knife 10' according to FIG. 2 differs from the cutting knife 10 according to FIGS. 1 and 3 insofar as the thread of the screw 32' is flattened laterally so that no extension of the slot 34' is required for permitting the introduction of the screw according to FIG. 1.

As can be further seen in FIG. 2, the slot 34' is provided with chamfers 35 on both edges so that the head portion 36 of the screw 32, being correspondingly bevelled laterally, is recessed in the slot 34'. The head portion 36 is also provided with a hexagonal socket 37 by means of which the head portion 36 can be rotated and/or held by a socket spanner. For the rest, the configuration of the slot 34', of the associated screw 32 and the roller 26, as well as its mounting arrangement, correspond to the design illustrated in FIGS. 1 and 3. This also applies to the structure of the cutting knife 10' which corresponds to that of the before-described cutting knife 10.

Figure 4:
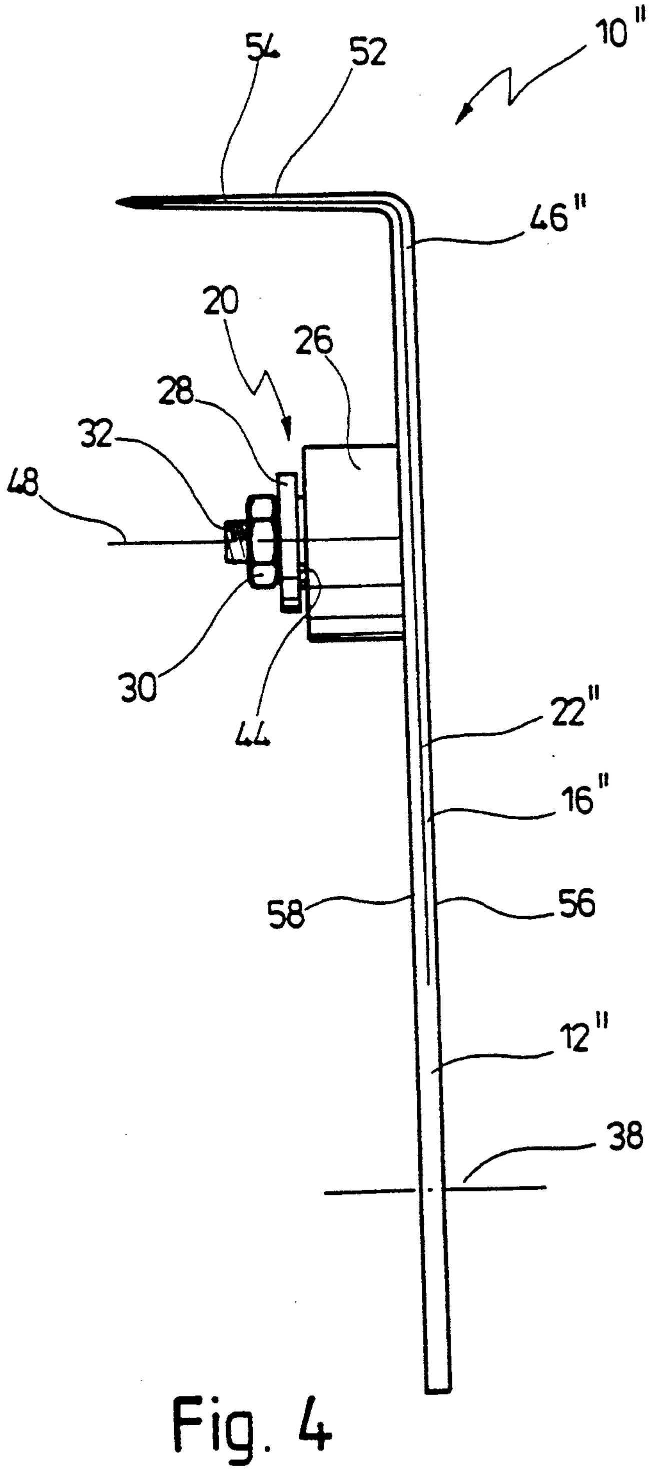
FIG. 4 shows a side view of still another embodiment of the cutting knife according to the invention, modified as compared with the embodiment of FIG. 3.

Another modified design of the cutting knife is illustrated in FIG. 4 and designated generally by numeral 10,,. Here again, the same reference numerals have been used as in FIGS. 1 and 3, to the extent the individual elements are identical.

The cutter element 16'' and the mounting element 12'' are designed as one integral part extending in one plane. At the end 46'' of the cutter element 16'', opposite the mounting element 12'', a second cutter element 52 is formed integrally with the cutter element 16'', projecting at a right angle therefrom.

The first cutter element 16'' and the second cutter element 52 are each sharpened on both sides up to about the middle of the their lateral edges to that a cutting edge 22'' is formed on both sides of the first cutter element 16'', the cutting edge 22'' extending midway between the bottom face 56 and the upper face 58 of the first cutter element 16'' and being followed directly, and at an angle, by the cutting edge 54 on the second cutter element 52.

For the rest, the structure of the cutting knife 10'' is absolutely identical to that of the cutting knife 10 illustrated in FIGS. 1 and 3.

We claim:

1. Cutting knife for a cutting tool equipped with an oscillating drive, for cutting off a cement bead of a glass pane cemented in place, in particular in a motor vehicle, said cutting knife comprising:

a mounting element provided with a mounting opening for mounting said cutting knife on said oscillating drive for oscillatingly driving said cutting knife at a small angular amplitude about a rocking shaft of said oscillating drive; and at least one cutter element extending from said mounting element, said cutter element having at least one cutting edge, a slot extending longitudinally within said cutter element, and a depth stop projecting laterally from said cutter element and functioning to limit a depth of penetration of said cutter element when cutting off a cement bead of a glass pane, said stop comprising a rotatable roller; and holding means engaging said slot in said cutter element for guiding said rotatable roller longitudinally displaceable along said slot and for setting said rotatable roller in any desired position along said slot;

wherein said holding means comprise a supporting part supporting said rotatable roller extending from a first surface of said cutter element, and a guiding part engaging said slot in substantially flush relationship with respect to a second surface of said cutter element which is opposite said first surface such that a surface of said guiding part is substantially coplanar with said second surface; and wherein said mounting element and said cutter element are integral.

2. Cutting knife according to claim 1, wherein said roller has an axis of rotation which extends substantially in a direction perpendicular to said cutter element.

3. Cutting knife according to claim 2, wherein said guiding part comprises a screw having a head portion which is held slidably within said slot, said supporting que comprises a supporting sleeve which is held coaxially on said screw for supporting said roller rotatable thereon.

4. Cutting knife according to claim 3, wherein said supporting sleeve comprises a retaining collar formed integrally therewith, said retaining collar supporting a nut which is screwed onto said screw fixed against rotation thereon.

5. Cutting knife according to claim 3, wherein said screw comprises a head portion and a shaft portion, and wherein at least said head portion comprises a flattened area on at least one side thereof.

6. Cutting knife according to claim 5, wherein said head portion of said screw has a hexagon socket.

7. Cutting knife according to claim 1, wherein said guiding part is guided in said slot in a manner fixed against rotation.

8. Cutting knife according to claim 1, wherein said slot comprises chamfers extending longitudinally thereon.

9. Cutting knife according to claim 3, wherein said roller is made from a soft material, in particular a plastic material.

10. Cutting knife according to claim 1, wherein said cutter element is connected to said mounting element via a connecting portion which is integral with said cutter element and said mounting element, said mounting element extending from a first end of said connecting portion in a first direction at an angle with respect to said connecting portion and said cutter element extending from a second end of said connecting portion at an angle with respect to said connecting portion in a direction that is generally opposite to said first direction.

11. Cutting knife according to claim 1, wherein a second cutter element is provided extending from an end of said first cutter element which is opposite said mounting element, and including an angle with said first cutter element.

12. Cutting knife according to claim 1, wherein one end of said slot is provided with an introduction opening for said holding means.

13. Cutting knife according to claim 1, wherein said roller is made from a metal of high ductility.

14. Cutting knife according to claim 1, wherein said roller is made from copper or a copper-based alloy.

15. Cutting knife for a cutting tool equipped with an oscillating drive, for cutting off a cement bead of a glass pane cemented in place, in particular in a motor vehicle, said cutting knife comprising:

a mounting element provided with a mounting opening for mounting said cutting knife on said oscillating drive for oscillatingly driving said cutting knife at a small angular amplitude about a rocking shaft of said oscillating drive; and at least one cutter element extending from said mounting element, said cutter element having at least one cutting edge, a slot extending longitudinally within said cutter element, and a depth stop projecting laterally from said cutter element and functioning to limit a depth of penetration of said cutter element when cutting off a cement bead of a glass pane, said stop comprising a rotatable roller; and holding means engaging said slot in said cutter element for guiding said rotatable roller longitudinally displaceable along said slot and for setting said rotatable roller in any desired position along said slot;

wherein said holding means comprise a supporting part supporting said rotatable roller extending from a first surface of said cutter element, and a guiding part engaging said slot in recessed relationship with respect to a second surface of said cutter element which is opposite said first surface; and wherein said mounting element and said cutter element are integral.

* * * * *